United States Patent [19]
Keil et al.

[11] Patent Number: 5,187,670
[45] Date of Patent: Feb. 16, 1993

[54] CONTROL SYSTEM FOR SCHEDULING PARTS IN A HEAT-TREATING PROCESS

[75] Inventors: Gary D. Keil, Elmwood; Gregory S. Holloway, Metamora, both of Ill.

[73] Assignee: Caterpillar Inc., Peoria, Ill.

[21] Appl. No.: 609,359

[22] Filed: Nov. 5, 1990

[51] Int. Cl.$^5$ .................. G06F 15/46; F27D 17/00
[52] U.S. Cl. ............................... 364/477; 432/11; 432/51
[58] Field of Search .............. 364/477, 468; 432/11, 432/13, 17, 51-53, 128, 133, 136, 138; 266/96-98, 249, 251, 252, 259

[56] References Cited

U.S. PATENT DOCUMENTS

| | | | |
|---|---|---|---|
| 2,013,905 | 9/1935 | Adams, Jr. | 263/7 |
| 3,598,381 | 8/1971 | Schwalm | 266/5 |
| 3,662,996 | 5/1972 | Schwalm | 266/4 |
| 4,622,006 | 11/1986 | Hohne | 432/11 |
| 4,763,880 | 8/1988 | Smith et al. | 266/87 |
| 4,845,238 | 7/1989 | Storm et al. | 364/477 |

FOREIGN PATENT DOCUMENTS 3506131 5/1986 Fed. Rep. of Germany .
86/02104 4/1986 PCT Int'l Appl. .

OTHER PUBLICATIONS

Article: "Modular Software-Pakete zur Integration von verketteten Kammerofensystemen und kontinuierlichen Oftenanlagen in den Fertigungas" pp. 114-119, vol. 44, No. 2, Dated Apr., 1989, By: A. Knieriem et al.
Article: "Extending Carburizing-Process Capabilities", pp. 41-48, vol. 137, No. 3, Dated: Mar., 1990, By: E. J. Kubel Jr.
Article: "Computers Tackle Heat-Treating Problems", pp. 33-38, vol. 137, No. 3, Dated: Mar., 1990, By: L. E. Jones et al.

*Primary Examiner*—Joseph Ruggiero
*Assistant Examiner*—Thomas E. Brown
*Attorney, Agent, or Firm*—David M. Masterson

[57] ABSTRACT

A control system for heat-treating parts in a furnace structure is provided. A plurality of processing chambers, each having at least one part position, are adapted to simultaneously process a plurality of parts each for a respective predetermined processing time. A memory device stores first records representing processing times associated with each of the parts within each processing chamber, second records representing a desired processing path associated with each part through at least one processing chamber, and third records representing the number and location of occupied part positions within each processing chamber. A computerized control center calculates desired processing times associated with at least one processing chamber for a new part to be processed in the processing chamber. Additionally, the computerized control center determines an entrance time for the new part to enter the furnace structure, in response to the first, second, and third records, and to the calculated desired processing times.

14 Claims, 8 Drawing Sheets

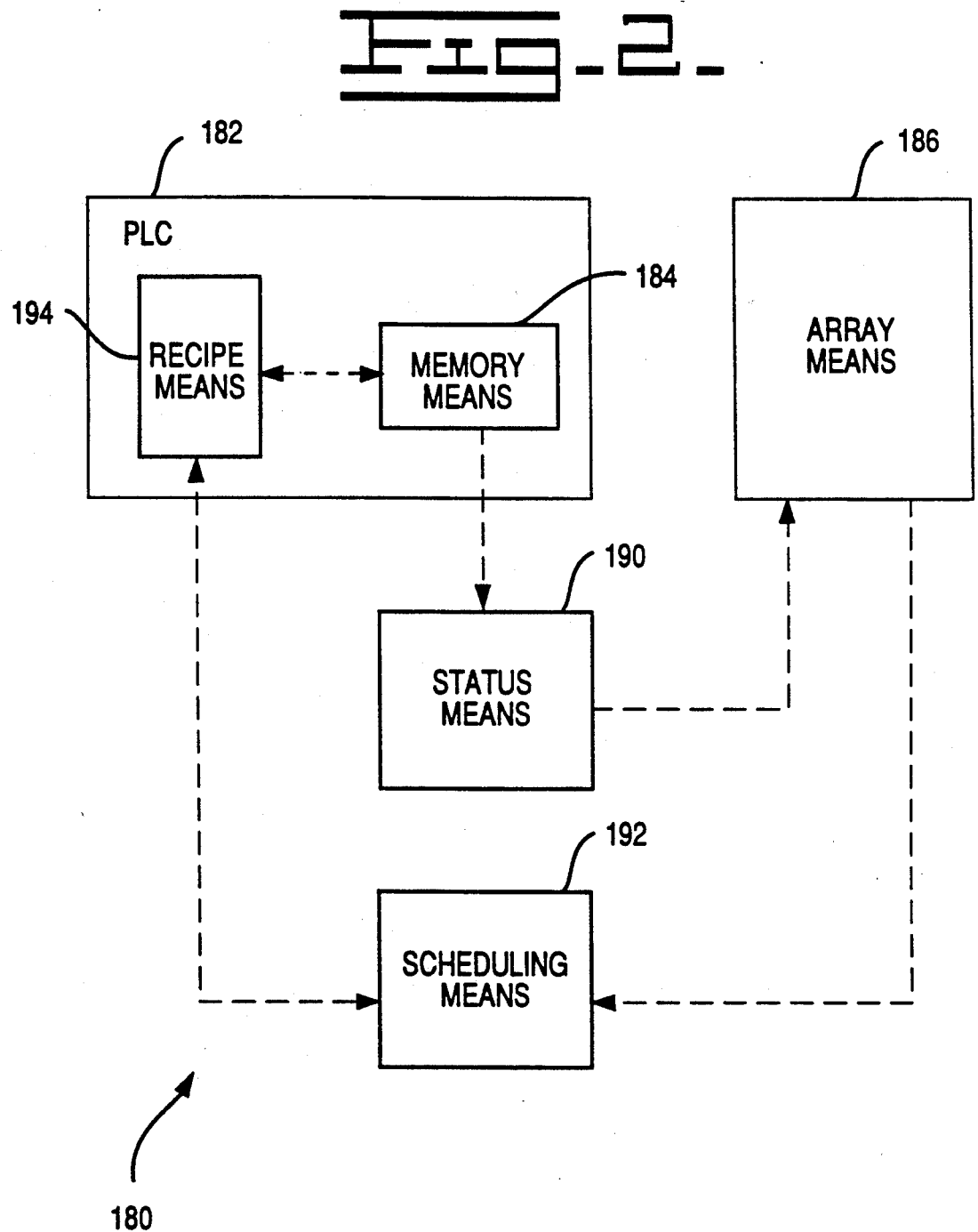

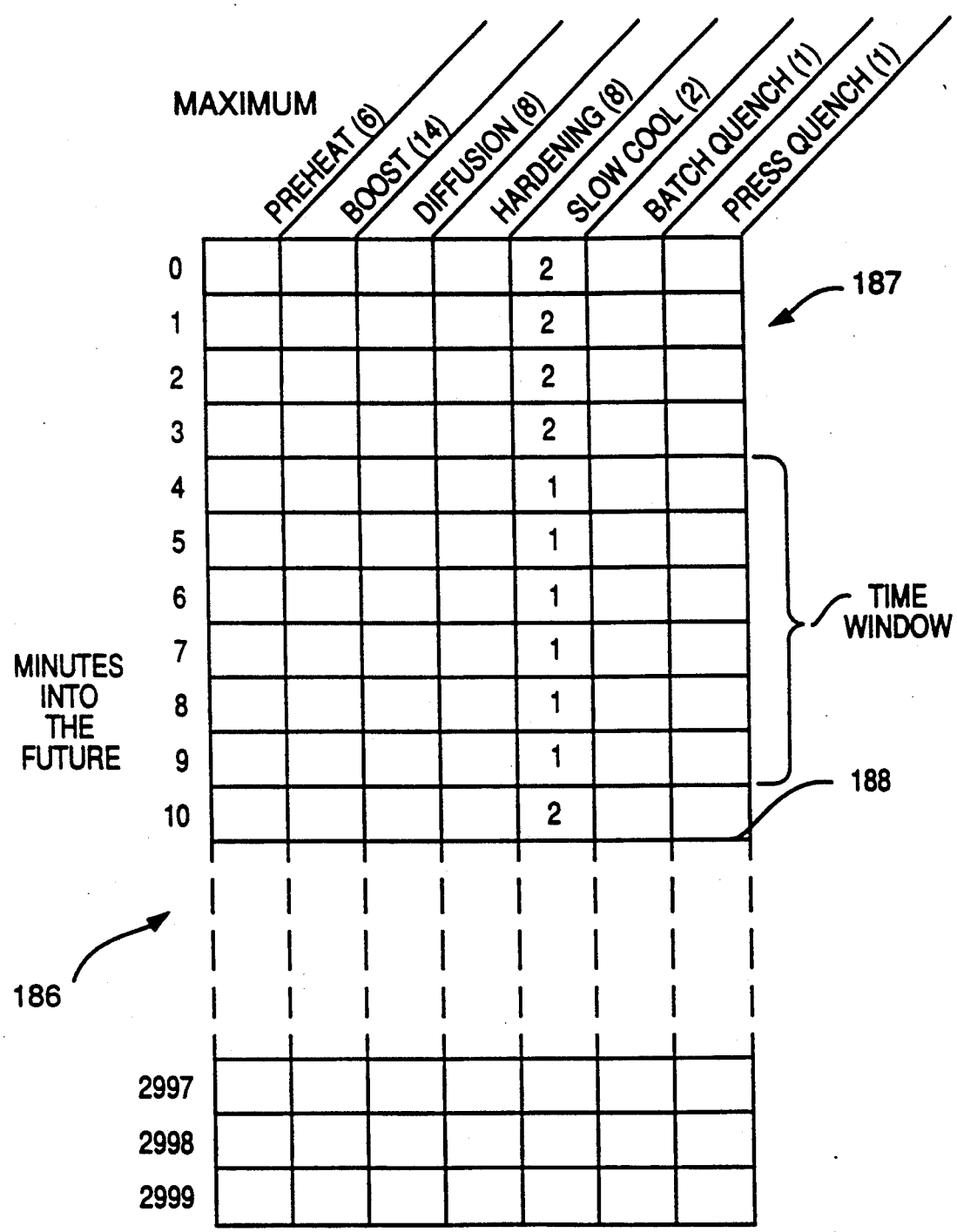

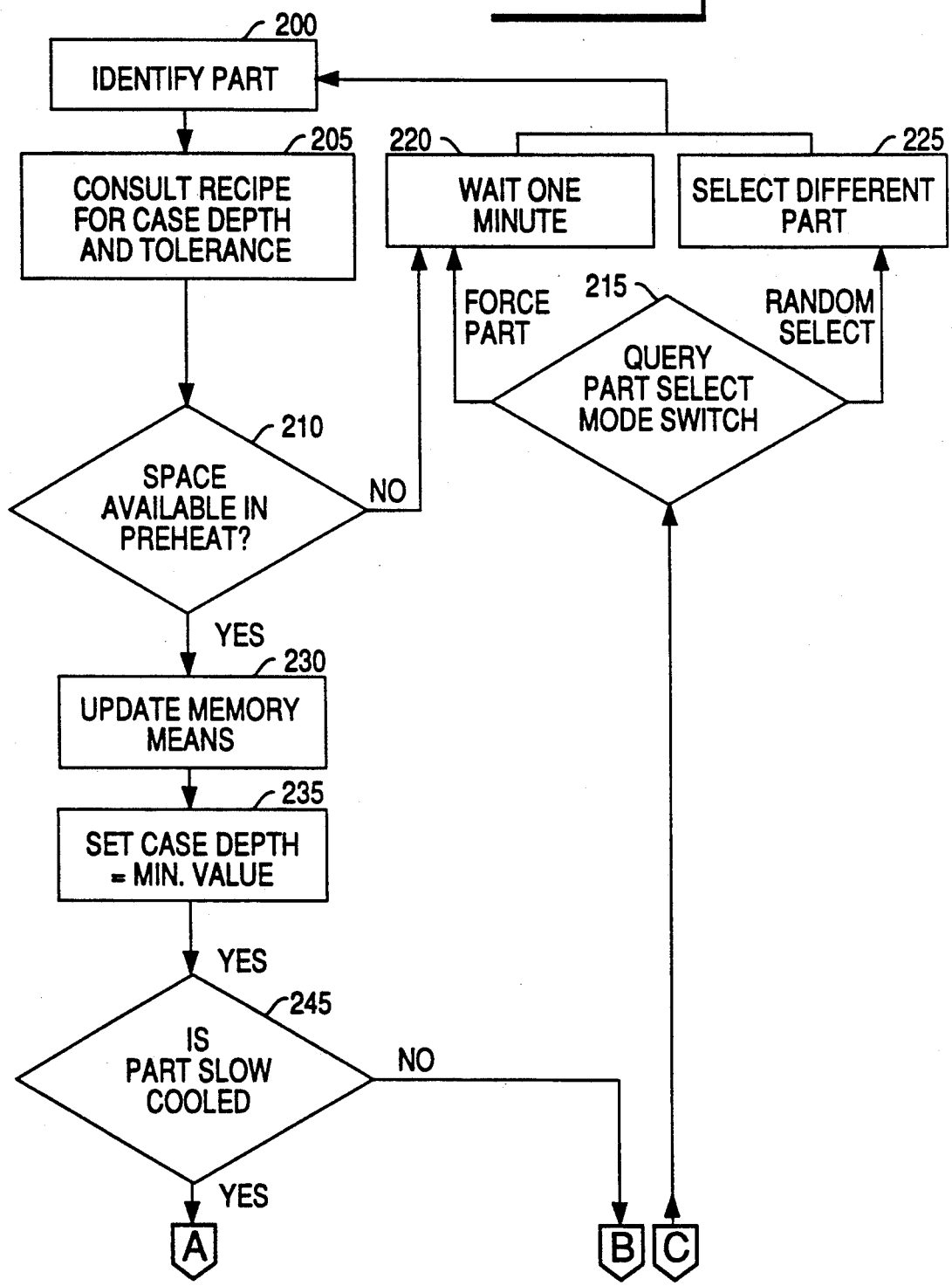

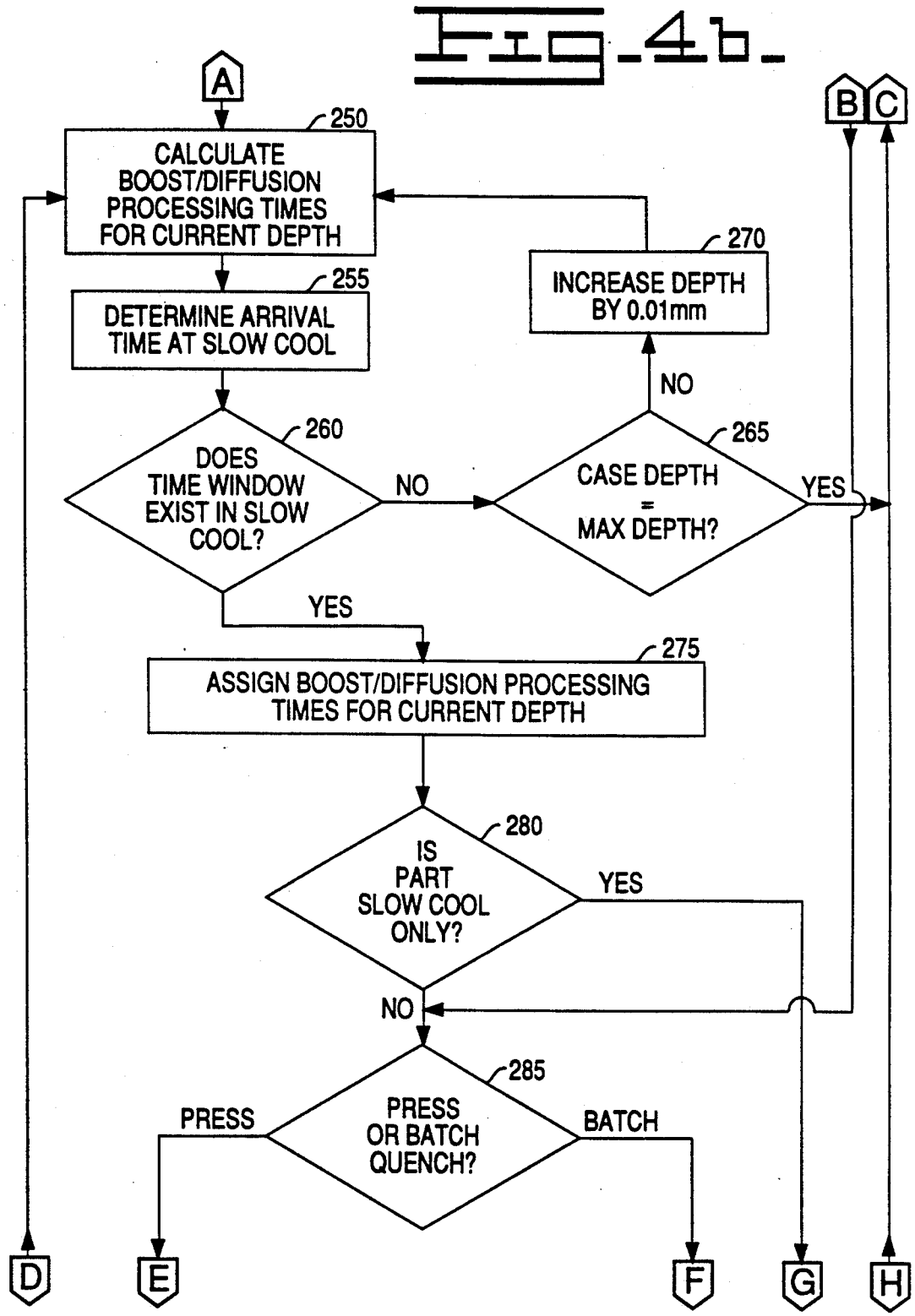
Fig_4b.

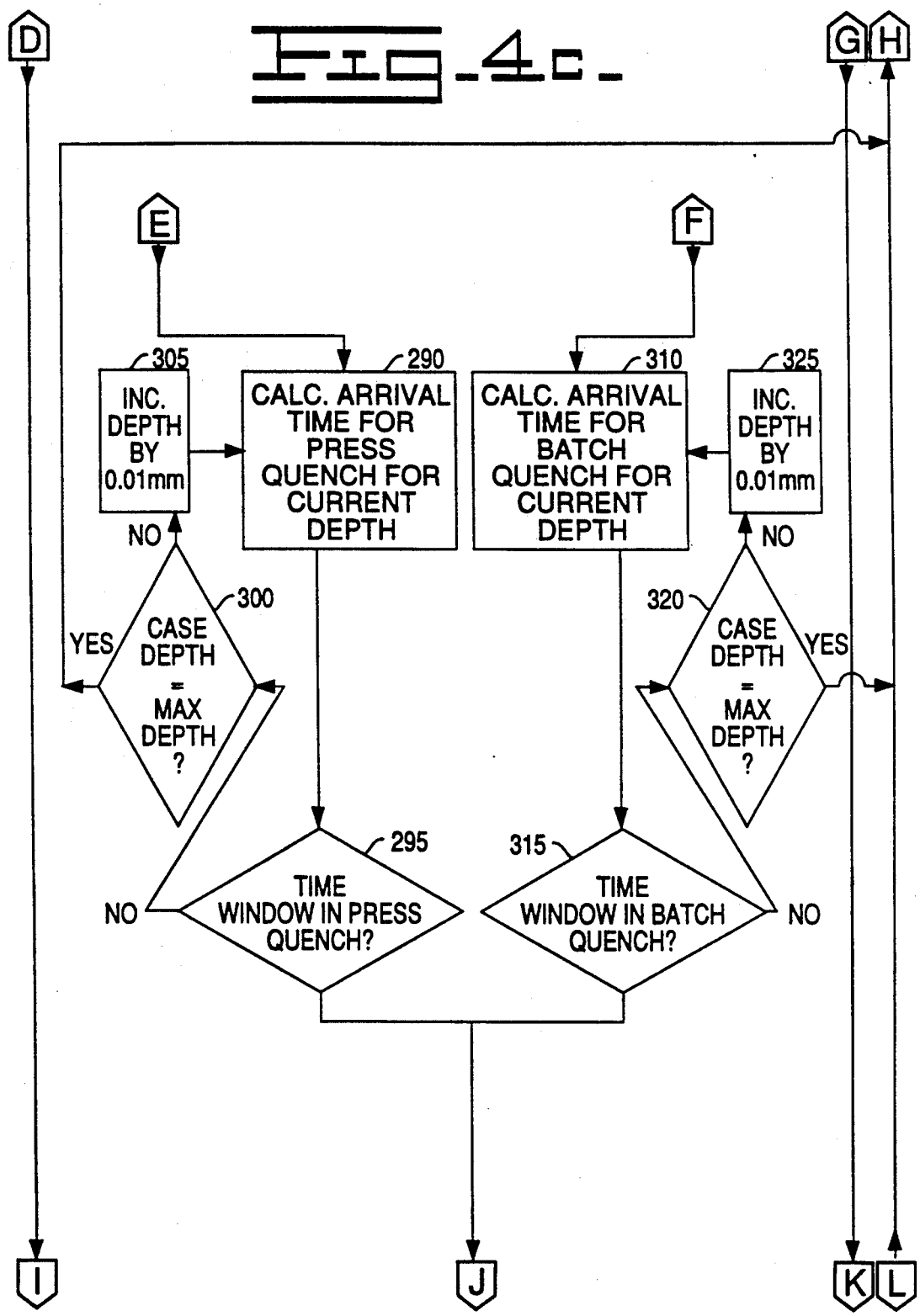

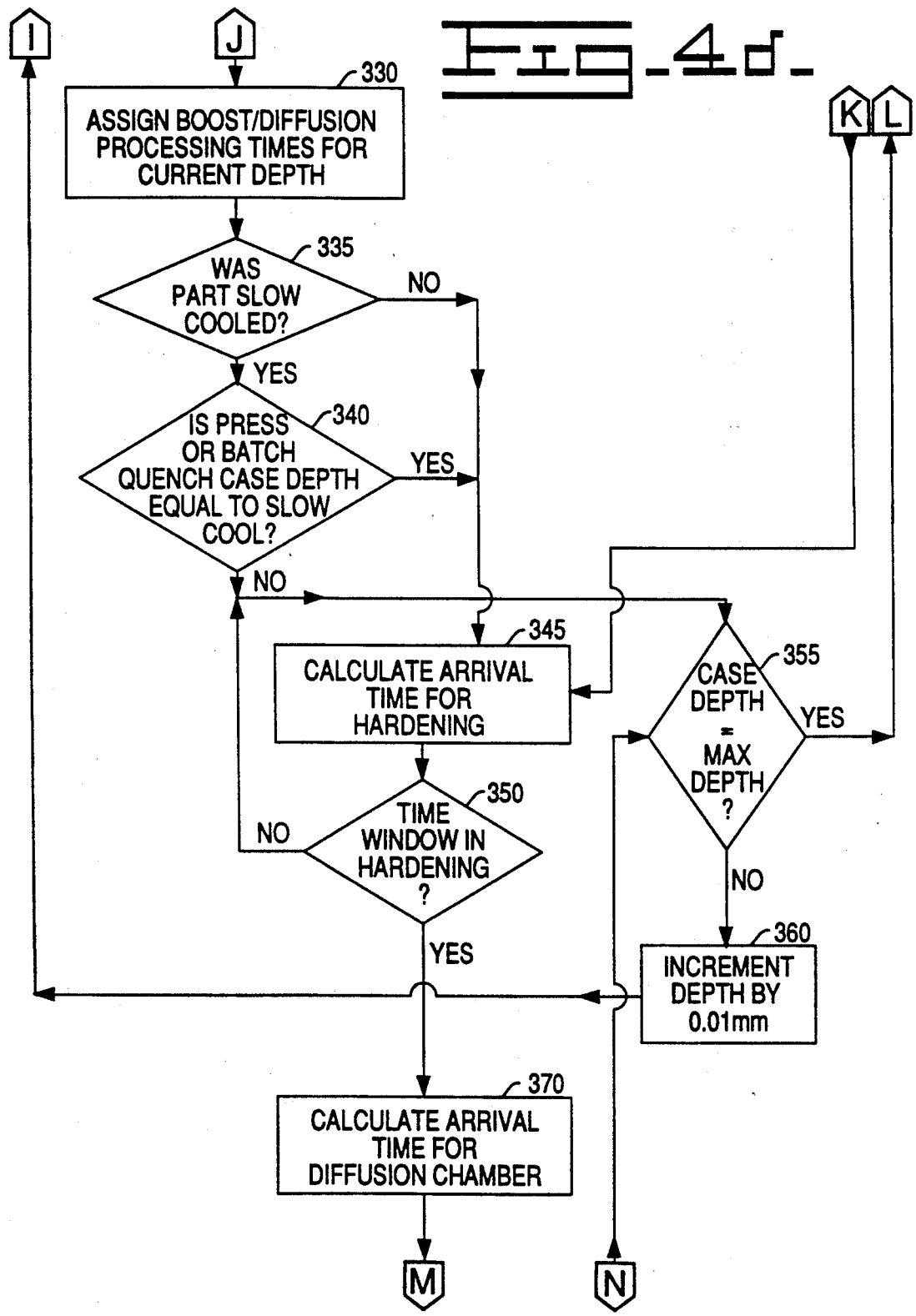
Fig_4d

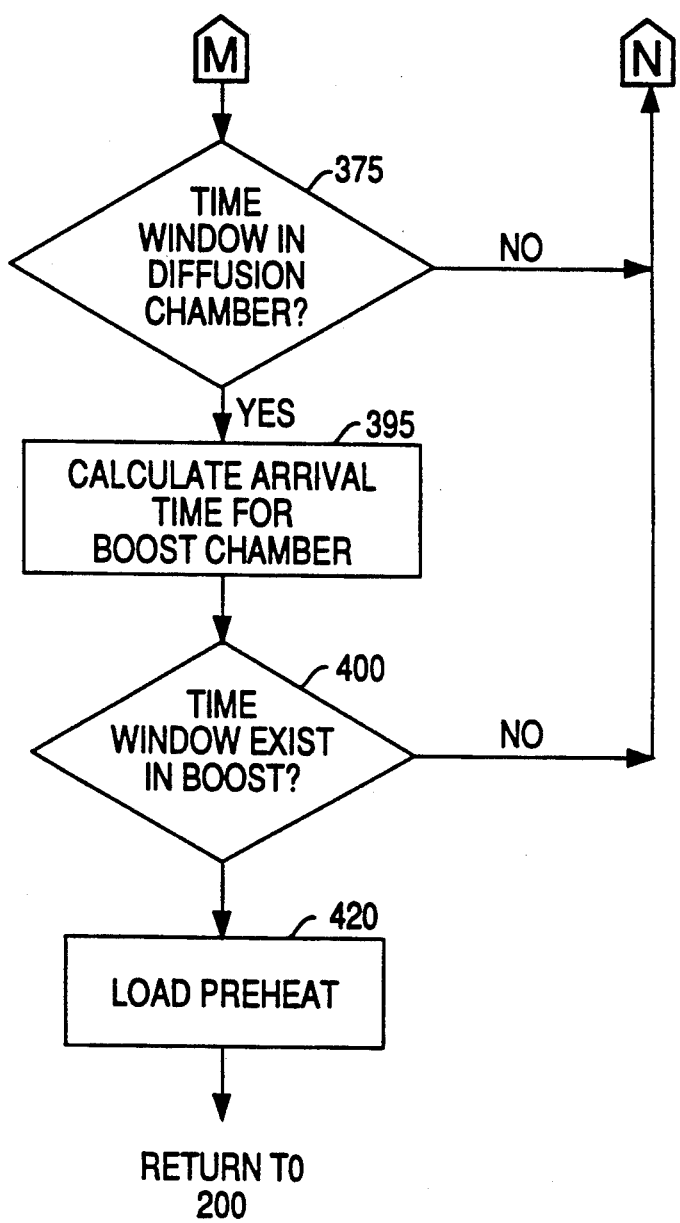

CONTROL SYSTEM FOR SCHEDULING PARTS IN A HEAT-TREATING PROCESS

TECHNICAL FIELD

This invention relates generally to a control system for scheduling parts to be processed in a furnace structure and more particularly to a control system which determines a part's processing time before the part enters the furnace structure and schedules entry of the part into the furnace structure.

BACKGROUND ART

Existing continuous carburizing furnace systems frequently include different sections or chambers for separating the various treatments employed in the carburizing processes-namely, heating, carburizing, diffusion, and hardening or equalize cooling. For example, U.S. Pat. Nos. 3,598,381 and 3,662,996 describe apparatus having separate furnace stages for heating, carburization, and diffusion of metal parts at selected temperatures and in different gaseous atmospheres for specific periods of time. In such systems, trays of parts are pushed or pulled, one after another, through each furnace in a fixed sequence, with each tray remaining in the same relative position in line throughout its passage through the system. Each part receives an identical process time.

Although the above-mentioned systems have been widely used for continuous runs of similar parts, they are not well-suited where it is necessary to process a variety of metal parts which require different cycle times and/or different times of quenching/cooling, and where it is desired to "manufacture-on-demand" a variety of parts so as to maintain low inventories.

Attempts have been made to provide greater flexibility of processing parts in furnace systems by the use of double rotary hearth carburizing furnaces, as disclosed in U.S. Pat. No. 4,622,006. U.S. Pat. No. 4,622,006 shows a rotary hearth carburizer and diffuser, providing a carburization and diffusion chamber separate from a conventional carburizing chamber. Systems of this type, don't allow parts to be processed in an efficient and smooth manner without some sort of scheduling.

For example, it is very likely that randomly loaded parts will need access to the same chamber at the same time. This results in at least one part having to spend an excessive amount of time in one chamber while waiting for access to the next chamber. Since the part is usually waiting in a hot chamber carburization continues, and the amount of carburization can be excessive, adversely affecting part quality. Additionally, the throughput of the furnace system can be affected, resulting in production loss.

The present invention is directed to overcoming one or more of the problems as set forth above.

DISCLOSURE OF THE INVENTION

In one aspect of the present invention, a control system for heat-treating parts in a furnace structure is provided. A plurality of processing chambers, each having at least one part position, are adapted to simultaneously process a plurality of parts each for a respective predetermined processing time. A memory device stores first records representing processing times associated with each of the parts within each processing chamber, second records representing a desired processing path associated with each part through at least one processing chamber, and third records representing the number and location of occupied part positions within each processing chamber. A computerized control center calculates desired processing times associated with at least one processing chamber for a new part to be processed in the processing chamber. Additionally, the computerized control center determines an entrance time for the new part to enter the furnace structure, in response to the first, second, and third records, and to the calculated desired processing times.

The invention also includes other features and advantages which will become apparent from a more detailed study of the drawing and specification.

BRIEF DESCRIPTION OF THE DRAWINGS

FIG. 2 is a the block diagram of the control system showing the functional relationships of the computerized control center;

FIG. 3 is a diagram showing the elements of the array; and

FIGS. 4A-4E are flowcharts describing the method and operation of the control system.

BEST MODE FOR CARRYING OUT THE INVENTION

Figure 1:
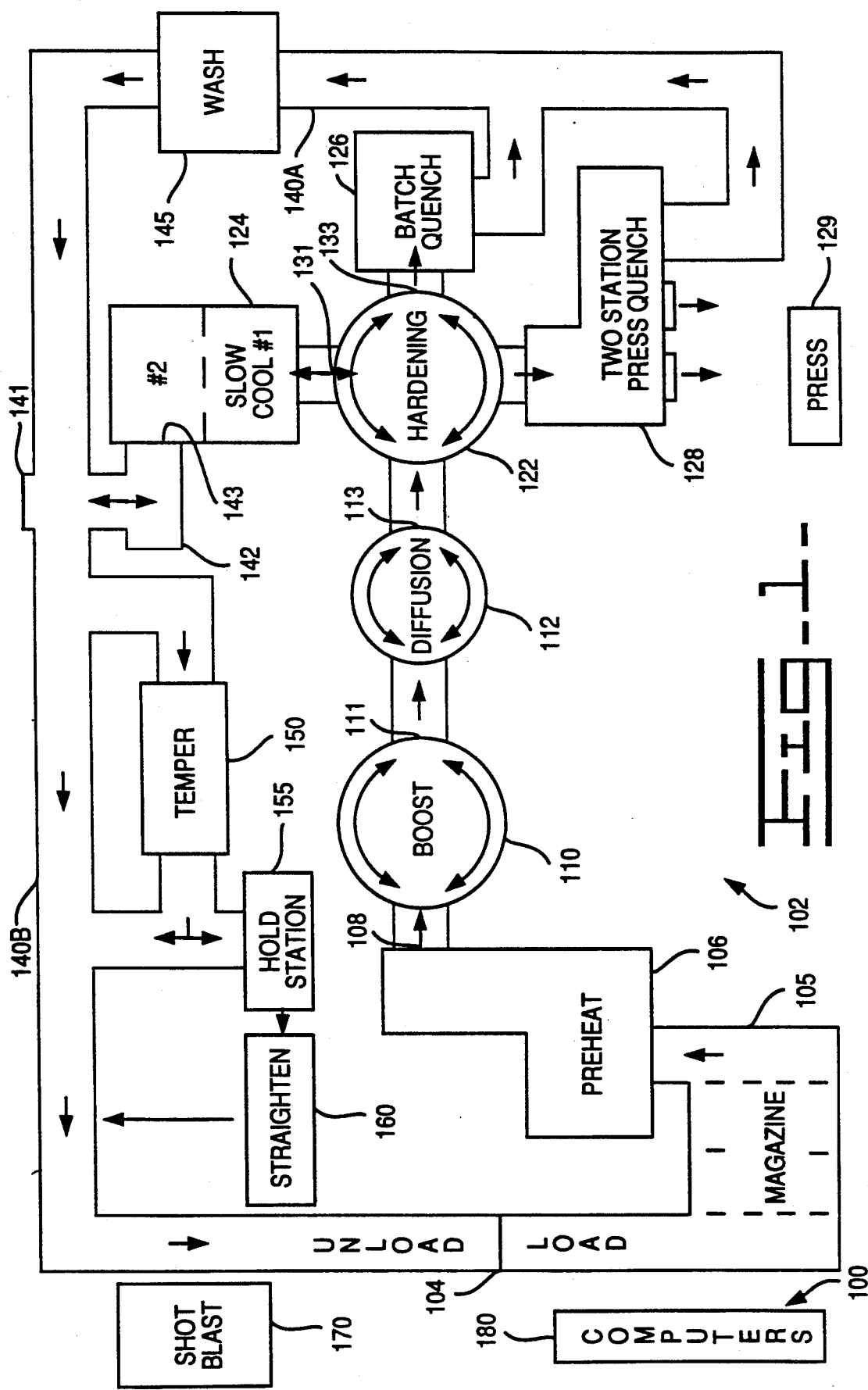
FIG. 1 is a diagrammatic top plan view of a preferred embodiment of the present invention disclosing a furnace structure.

Referring now to, FIG. 1, depicts a control system 100 for heat-treating parts in a furnace structure 102. The furnace structure 102 includes several interconnected processing chambers 106,110,112,122,124,126,128, each forming a separate furnace chamber in which parts are processed and hardened during a carburizing cycle. The processing chambers each have a plurality of part positions. Also, the processing chambers are adapted to simultaneously process a plurality of parts each for a respective predetermined processing time. The term carburizing is intended to include processing not only in carbon-rich gas atmospheres, but also in carbon/nitrogen atmospheres. The processing chambers 102 include: a preheating chamber 106, carburizing chambers 110,112, a hardening chamber 122, a slow cool chamber 124, a batch quench chamber 126, and a press quench chamber 128. These chambers and other components of the continuous carburizing chamber structure will now be described in the order in which parts are processed during a typical carburizing cycle. The instant embodiment of the invention is preferably practiced with carburizing, however, the invention is also well suited for such processes as carbonitriding, nitriding, or hardening.

Trays loaded with parts to be carburized, e.g., gears, shafts, and other steel parts desirable to harden the surface, are first moved from a load/unload area 104 to a magazine type loader 105. The magazine type loader 105 selectively loads the parts into the preheating chamber 106 either by random part loading or FIFO type loading. Parts loaded into the preheating chamber 106 and maneuvered between succeeding chambers are typically moved with a motor-driven pusher (not shown). Motor-driven pushers are well known in the art and their operation will not be described. The preheating chamber 106 is adapted to heat the parts to a predetermined temperature, for example 1700° F. Typically, the preheating chamber 106 is a conventional unit through which parts or trays of parts are transported in the order in which they enter. The preheating chamber 106 may achieve some flexibility of processing order through the use of dual rows with each row capable of being pushed at a different rate, or may be of the rotary type. The exit of the preheating chamber 106 is connected to the carburizing chambers 110,112.

When it is desired to move a tray of parts into the carburizing chambers 110,112 the doors are raised and the tray of parts enters. The carburizing chambers 110,112 are adapted to expose the preheated parts to a reactive carbon gases at elevated temperatures. Preferably the carburizing chambers 110,112 are series-connected rotary chambers, having rotatable hearths (not shown), which are variable cycle. Rotary chambers permit parts to be discharged in any selected order independent of the time and sequence of input. Preferably, the hearths are rotated continuously except when stopped to receive or discharge parts.

One of the carburizing chambers is a boost chamber 110. The boost chamber 110 has a controlled carbon-enriched gaseous atmosphere typically with a carbon content in the range of about 1-3.5% by weight, at a desired elevated temperature of about 1700° F. Because any point of the boost chamber 110 may be rotated to a discharge position 109, any tray of parts may be brought to the discharge position at any time regardless of how long the tray has remained in the boost chamber 108. This permits a mix of parts, some of which require longer carburizing times than others—for example to achieve greater case depths of carburization—to be carburized simultaneously in the chamber 110. Temperature sensors (not shown) monitor and control the temperature of the processing chambers 106,110,112,122,124,126,128. When the carburization of a tray of parts in the boost Chamber 110 nears completion, the hearth is rotated to place the tray in the discharge position 111. Doors (not shown) separating the carburizing chambers 110,112 are opened and the tray of parts is then transferred to the a diffusion chamber 112.

The diffusion chamber 112 is of similar structure to the carburizing chamber but normally has smaller chambers. For example, the diffusion chamber 112 may have eight tray positions as compared to the fourteen which may be provided in the boost chamber 110. This is possible because part residence times in the diffusion chamber 112 are substantially shorter than those in the boost chamber 110, therefore fewer tray positions are required to process the same number of parts as were treated in the boost chamber 110. The diffusion chamber 112 functions to adjust the carbon content in the outer layers of the parts, advantageously producing a uniform level of carbon from the surface of the parts to a predetermined depth. To accomplish this, a gaseous atmosphere of somewhat lower carbon content than is utilized in the boost chamber 110, for example 0.9%, is provided in the diffusion chamber 112 at a selected diffusion temperature of about 1700° F. The diffusion chamber 112, like the boost chamber 110, permits parts requiring different diffusion times to be processed together at the same time in the diffusion chamber 112. After selected parts have been heat-treated in the diffusion chamber 112 for a predetermined time, the hearth rotates to move the tray containing the parts to a discharge position 113. Doors (not shown) separating the diffusion chamber 112 and a hardening chamber 122 are opened and the tray of parts is pushed into the hardening chamber 122.

The hardening chamber 122 is similar in structure to the rotary carburizing chambers 110,112. The hardening chamber 122 includes three outlets 131,133,135 to permit different quench and cooling treatments to be utilized as required. The hardening chamber 122 thus serves as a transport device having considerable flexibility in moving parts to different quenching stations. Additionally, the hardening chamber 122 maintains a carbon rich gaseous atmosphere, for example 0.9%, and also functions to lower the temperature of parts to a hardening temperature, typically 1550° F., prior to quenching. Additionally, the hardening chamber 122 is adapted to reheat parts reintroduced into the hardening chamber 122 from the slow cool chamber adjacent to the outlet 131 to a hardening temperature prior to quenching.

As shown in FIG. 1, one outlet 133 of the hardening chamber 122 leads to the batch quench chamber 126. Parts are rotated to the outlet position 133 of the hardening chamber 122 and onto the elevator (not shown) of the batch quench apparatus. The parts are lowered into a tank filled with a quench medium such as oil, and are dunk-quenched, then raised and moved to a post-quench transport line 140 A.

For parts to be slow-cooled to temperatures of approximately 700°-800° F., the hardening chamber 122 is rotated to a position adjacent to the outlet 131 in front of the slow-cool chamber 124. Parts may either move down the transport line 140B or return to the hardening chamber 122. Parts returning to the hardening chamber 122 are reheated, and then quenched.

For parts to be press quenched, the hardening chamber 122 is rotated to a position adjacent to the outlet 135 in front of the press quench chamber 128. Parts are then removed manually from the press quench chamber 128 to quench in a press 129, which includes fixtures or dies to hold parts tightly while a quench medium is applied.

Optionally, for parts to be slow cooled only, the parts may enter through door 141 to a conveyer and moved to a rest position 142. Then the parts are pushed through a door 143 separating the slow cool chamber 124 from the rest position 142, and enter the slow cool chamber 124. The parts transfer to the hardening chamber 122 until a hardening temperature is reached and then move to either the press quench 128 or batch quench 126.

After being quenched, parts are transported thorough other conventional components of the chamber structure 102 for post-quench processing. As illustrated in FIG. 1, quenched parts are passed in the order in which they arrive at a post-quench position through a wash 145, and then optionally through a tempering chamber 150. If necessary, parts are manually straightened at a station 155,160 near the outlet of the tempering chamber 150. Cleaning of parts may be performed in a shot blast station 170.

During a processing cycle, parts typically remain in the boost chamber 110 for about 1-40 hours, and in the diffusion chamber 112 and the hardening chamber 122 for about 0.1-10 hours each, depending on the type of part being heat-treated and the case depth desired.

The control system 100 includes a computerized control center 180. Preferably the control center 180 includes a plurality of microcomputers (not shown). The control center 180 includes a Programmable Logic Controller (PLC) 182 connected to encoders linked to each of the chambers 106,110,112,122,124,126,128 to keep track of the position and processing conditions of each tray of parts within each of the chambers 106,110,112,122,124,126,128. Additionally, limit switches may be employed by the PLC to aid in the tracking of the parts. Limit switches are well known in the art and will not be further discussed. The continual tracking of parts allows determination of the location of each tray within the furnace structure 102, permitting processing records to be accumulated for each tray. The instant invention is not limited to the use of trays, it may be preferable to have parts with no trays; therefore, when a part is referred to, it is understood to be either one part with no tray, one part within a tray, or many related parts within a tray—the control system 100 advantageously treats each as the same. The processing records are stored in files contained in the PLC 182 in RAM memory, referred to as a memory means 184. Additionally, the control center 180 includes menus and commands for controlling the various doors, pushers, and the rotation of the chambers, and for presetting furnace temperatures and carbon atmosphere contents as dictated by the PLC 182 in a manner that is well known in the art.

As shown in FIG. 2, the control system 100 includes the PLC 182 and the memory means 184 for storing first records representing processing times associated with each of the parts within each processing chamber 106,110,112,122,124,126,128, second records representing a desired processing path associated with each part through at least one processing chamber, and third records representing the number and location of occupied part positions within each processing chamber 106,110,112,122,124,126,128. The first records represent elapsed, calculated desired, and associated predetermined processing times. The second records represent the processing path for each part to be processed by the furnace structure. A part may not need processing by all the processing chambers. For example a part may need to be slow cooled only, therefore, the quenching operation will not be scheduled for that part. Also, the processing is part specific. The third records are represented by files in the memory means 184 and are updated by various encoders connected to the furnace structure 102. Therefore, the location and position of a part within the furnace structure 102 is reflected by the third records. An array means 186 is included in the control system 100 for storing time window records in response to the first, second, and third records. The time window records represent the number of part positions available within each processing chamber 106,110,112,122,124,126,128 during predetermined periods of time. As shown in FIG. 3, the array means 186 is a 2-dimensional array composed of a plurality of memory cells 187. Each cell 188 in the array means 186 corresponds to the number of parts, in a predetermined discrete period of time, in a particular processing chamber 106,110,112,122,124,126,128. As shown, 3000 minutes is the predetermined periods of time, in which the 0 minute is the current or actual time and the other times (1-2999) are minutes into the future. Shown at the top of the chart in FIG. 3 is the maximum available tray or part positions for each processing chamber.

The control system 100 also includes a status means 190 for periodically updating the time window records. As shown in FIG. 2, the status means 190 transfers information from the records stored in the memory means 184 to populate the array means 186. Hence, the array means 186, as updated by the status means 190, provides an accurate representation of the contents of each processing chamber 106,110,112,122,124,126,128 corresponding to the actual and future time associated with each processing chamber.

The control system 100 includes a scheduling means 192 for calculating desired processing times associated with at least one processing chamber for a new part to be processed. In the preferred embodiment, the scheduling means 192 calculates desired processing times associated with the boost and diffusion chambers 110, 112 for each new part. Additionally, the scheduling means 192 determines an entrance time for the new part to enter the furnace structure 102 in the preheating chamber 106 or the slow cool chamber 124. The control system 100 also includes a recipe means 194 for assigning a predetermined case depth range between minimum and maximum values for each new part. The desired processing times of the new part are responsive to the predetermined case depth range. Calculating processing times to achieve an acceptable case depth value of carburization is well known in the art and the calculations involved in determining the processing times will not be discussed. Preferably, the recipe means 194 is a data base contained within the PLC 182 which indicates the predetermined case depth range of carburization and predetermined processing times for the hardening, slow cool, batch quench, and press quench chambers 124,126,128 for each part. Additionally, the recipe means 194 indicates the type of quenching for the part and whether or not the part should be slow cooled. Preferably, the recipe means associates predetermined processing times with the preheat, hardening, cooling, and quenching chambers 106,122,124,126,128 in accordance with the path of each part through the furnace structure 102, as indicated by the third record. The entrance time is responsive to the desired and predetermined processing times.

The scheduling means 192 includes means for determining time windows for entry of parts into each of the processing chambers 106,110,112,122,124,126,128, in response to the time window records. The time window represents a particular time when the part may enter a particular processing chamber for complete processing with regard to that chamber. Essentially, the time window is an opening (in time) of sufficient length to process a part. Therefore, the time window corresponds to the availability of a particular chamber to process the part in the desired or predetermined processing time. The time window is found within the array means 186. For example, assume there are four parts residing in the hardening chamber 122, with the first part scheduled to exit the hardening chamber 122 in 2 minutes and transfer to the slow cool chamber 124 for 3 minutes. The second part is scheduled to exit the hardening chamber 122 in 6 minutes and transfer to the press quench 128 for 2 minutes. The third part is scheduled exit the hardening chamber 122 in 10 minutes and transfer to the slow cool chamber for 12 minutes. The fourth part is scheduled to exit the hardening chamber 122 in 3 minutes and transfer to the slow cool chamber for 6 minutes of processing. Note the maximum number of parts that may be processed in the slow cool chamber is two. Therefore, FIG. 3 shows a time window existing for 6 minutes in the slow cool chamber.

Once the desired and predetermined processing times for each processing chambers have been evaluated for a specified case depth, the part may then enter the furnace structure 102 at the preheating chamber 106. Thus, the entrance time is responsive to the desired and predetermined processing times.

The memory means 184, array means 186, status means 190, scheduling means 192, and recipe means 194 are advantageously implemented in software within the computerized control center 180.

The flow chart shown in FIGS. 4(A-E) depicts a computer program that operates with the computerized control center 180 prior to the insertion of a part into the preheating chamber 106. The computer program provides the information necessary for the control system 100 to schedule the complete processing time for a part's entire process within the furnace structure 102 before the part is entered into the preheating chamber 106. Advantageously, the control center 180 is able to schedule the part's entire processing time in the furnace structure 102 in a manner that provides for a smooth and uninterrupted flow through the furnace structure 102.

Element 200 of the flow chart indicates the beginning of the computer program. An operator enters the part number of a part to be processed into a terminal (not shown) connected to the control center 180. Accordingly, a desired case depth value of carburization corresponding to a predetermined case depth range is ascertained by the recipe means 194, in the block 205. Next, the control center 180 polls the memory means 184 to determine if a part position is available in the preheating chamber 106, in the block 210. In one embodiment, each part remains in the preheating chamber 106 for ninety minutes. If a position is not available, the computer program moves to the block 220, delays one minute, and restarts. If a position is immediately available in the preheating chamber 106, the computer program continues to the block 230 in which the memory means 184 is updated with the processing times of all the parts and the part positions occupied, within the furnace structure 102. The case depth value is then set to the minimum value according to the predetermined case depth range in the block 235.

The recipe means 194 is then polled to determine if the part is to be slow cooled in the slow cool chamber 124, in the block 245. If the part is not to be slow cooled, the computer program proceeds to the block 285 to determine if the part is to be press quenched or batch quenched. If the part is to be slow cooled, the control center 180 proceeds to calculate the desired and predetermined processing times associated with the part, according to the path through the furnace structure 102, in response to the current case depth, in the block 250. The control center 180 determines the part's arrival time for the slow cool chamber 127 in the block 255, by combining the calculated desired processing times with the predetermined processing times. In the block 260, the array means 186 is polled to determine if a time window exists in the slow cool chamber 124. If a time window is not available, the current case depth value is compared to the maximum case depth value in the block 265. If the current case depth value is at the maximum depth, then the computer program proceeds to the block 215 and the control center 180 polls a part select mode switch (not shown).

The part select mode switch is indicative of the magazine operation as set by the operator. For example, if an entrance time is not available for a new part corresponding to a particular case depth range, the magazine may (random select mode) schedule a different part into the structure, which may correspond to a different case depth range and restart, or (force part mode) wait one minute, in the block 220 and restart.

In the block 215, the mode of the part select switch is determined, and the computer program proceeds with the indicated mode and restarts.

If the current case depth value is less than the maximum case depth value, the current case depth value is incremented by a predetermined amount in the block 270, for example 0.01 mm, and the computer program returns to the block 250 to repeat the processing time calculations. If a time window exists in the array means 186 for the slow cool chamber 124, the desired processing times for the boost and diffusion chambers are recorded in the memory means 184 according to the current case depth, in the block 275.

It is possible that a part may, as indicated by the recipe means 194, only utilize the slow cool process and no other cooling processes. As determined in the block 280, for a part to be slow cooled only, the computer program proceeds to the block 350.

If the part is utilize other cooling operations, the recipe means 190 is polled to determine the particular type of quenching desired, either press quenching or batch quenching, in the block 285. The processing times for the batch quench and press quench chambers 126,128 are predetermined by the recipe means 194 for each part. For press quenching, the control center 180 polls the memory means 184 and calculates the arrival time for the press quench chamber 128, in the block 290. The arrival time is a combination of the boost and diffusion calculated processing times, with the predetermined processing times in accordance to the desired path through the furnace structure 102. The control center 180 determines if a time window exists within the array means 186 for processing the part in the press quench chamber 128, in the block 295. If a time window does not exist for the press quench chamber 128, then the control center 180 compares the current case depth to the maximum allowable depth, in the block 300. If the current case depth is equal to the maximum allowable depth, the computer program returns to the block 215, determines the mode of the part select switch, proceeds with the indicated mode, and restarts. If the current case depth is less than the maximum depth, the depth is increased by a predetermined amount, for example 0.01 mm, in the block 305. The computer program then proceeds to the block 290. In the block 290, the control center 180 recalculates the desired processing times associated with the boost and diffusion chambers 110,112 in response to the incremented case depth. The desired and predetermined processing times are combined to calculate the arrival time for the press quench chamber 128. If a time window exists for the press quenching operation, the processing times associated with the boost and diffusion chambers 110,112 corresponding to the current case depth are recorded in the memory means 184, in the block 330, and the computer program continues to the block 335.

For batch quenching, the control center 180 polls the memory means 184 and calculates the arrival time for the batch quench chamber 126, in the block 290. The arrival time is a combination of the boost and diffusion calculated processing times, with the processing times predetermined in accordance with the desired path through the furnace structure 102. The control center 180 determines if a time window exists within the array means 186 for processing the part in the batch quench chamber 126, in the block 295. If a time window does not exist for the batch quench chamber 126, then the control center 180 compares the current case depth to the maximum allowable depth, in the block 300. If the current case depth is equal to the maximum allowable depth, the computer program returns to the block 215, determines the mode of the part select switch, proceeds with the indicated mode, and restarts. If the current case depth is less than the maximum depth, the depth is increased by a predetermined amount, for example 0.01 mm, in the block 305. The computer program then proceeds to the block 290. In the block 290, the control center 180 recalculates the desired processing times associated with the boost and diffusion chambers 110,112 in response to the incremented case depth. The desired and predetermined processing times are combined to calculate the arrival time for the batch quench chamber 126. If a time window exists for the batch quenching operation, the processing times associated with the boost and diffusion chambers 110,112 corresponding to the current case depth are recorded in the memory means 184 in the block 330, and the computer program continues to the block 335.

Referring to the block 335, the control center 180 identifies, by polling the recipe mean s 190, if the part is to be processed by the slow cool chamber 124. If the part is to be slow cooled, then the control center 180 determines if the case depth value determined during the quench decision process is equivalent to the case depth value determined during the slow cool decision process, in the block 340. If the case depths are precisely the same or if no slow cooling took place, the computer program proceeds to the block 345.

If the values are not the same, the computer program proceeds to the block 355 to determine if the current case depth value calculated in the quench decision process is equal to the maximum case depth value. If the maximum case depth value has been reached, then the computer program returns to the block 215. If not, then the current case depth value is incremented in the block 360 and the computer program returns to the block 250 and the boost and diffusion processing times are recalculated for the incremented case depth. The computer program then proceeds in accordance with the decision blocks.

At the block 345, the control center 180 determines the arrival time for the part at the hardening chamber 122. The arrival time is a combination of the boost and diffusion processing times, with the processing times predetermined in accordance to the path of the part through the furnace structure 102. The predetermined processing time for each part in the hardening chamber 122 is indicated by the recipe means 194. The control center 180 determines if a time window exists within the array means 186 for the hardening chamber 122, in the block 350. If a time window for the hardening chamber 122 does not exist, the current case depth value is compared to the maximum case depth value in the block 355, and the computer program returns to the block 215 if the current case depth is equivalent to the maximum case depth. If the current case depth value of the part is less than the maximum case depth value in the block 355, then the depth is incremented by a predetermined amount in the block 360, for example 0.01 mm, and the computer program returns to the block 250 to calculate the desired processing times corresponding to the incremented case depth value. If a time window exists for the hardening chamber 122 as determined in the block 350, the desired processing times for the boost and diffusion chambers, associated with the current case depth value, are stored in the memory means 184.

The control center 180 determines the arrival time for the diffusion chamber 112, in the block 370. The arrival time is a combination of the boost and diffusion processing times with the predetermined processing time associated with the preheating chamber 106. The calculated desired processing times associated with the diffusion chamber 112 are variable to advantageously allow a degree of flexibility in scheduling the processing of each part. Therefore, as the case depth values vary, the calculated desired processing times associated with the diffusion chamber 112 vary. A time window associated with the diffusion chamber 112 is determined by the control center 180, in the block 375. If a time window does not exist, then the computer program returns to the block 355 to compare the current case depth value with the maximum case depth value. If the current case depth value is equivalent to the maximum case depth, the computer program returns to the block 215, determines the mode of the part select switch, proceeds with the indicated mode, and restarts. If the current case depth is less than the maximum depth, the depth is increased by a predetermined amount in the block 360, for example 0.01 mm, and the computer program returns to the block 250 to calculate the boost and diffusion processing times corresponding to the incremented case depth. If a time window exists for the diffusion chamber 112, then the computer program proceeds to the block 395.

The control center 180 determines the arrival time for the boost chamber 110 in the block 395. The arrival time is a combination of the boost processing time with the predetermined processing time associated with the preheating chamber 106. As with the diffusion chamber 112, the calculated desired processing times associated with the boost chamber 110 are also variable to advantageously allow a degree of flexibility in scheduling the processing of all parts. A time window associated with the boost chamber 110 is determined by the control center 180, in the block 400. If a time window does not exist, then the computer program returns to the block 355 to compare the current case depth value with the maximum case depth value. If the current case depth value is equivalent to the maximum case depth, the computer program returns to the block 215, determines the mode of the part select switch, proceeds with the indicated mode, and restarts. If the current case depth is less than the maximum depth, the depth is increased by a predetermined amount in the block 360, for example 0.01 mm, and the computer program returns to the block 250 to recalculate the boost and diffusion processing times corresponding to the incremented case depth. If a time window exists for the boost chamber 110, then the computer program proceeds to the block 420.

Accordingly, in the block 420 the magazine loads the part in the preheating chamber 106 to begin processing.

Industrial Applicability

The operation of the present invention is best described in relation to its use in scheduling a new part to be heat treated in the furnace structure 102 as shown in the FIGS. 4A-4E. The computerized control center 180 schedules the new part from back to front. This implies that the contents of the quench and slow cool chambers 124,126,128 are scheduled first, followed by the contents of the hardening chamber 122, followed by the contents of the diffusion chamber 112, etc. The values shown in the following discussion are for exemplary purposes only.

An operator enters the part number of a new part to be processed, in the block 200. In the block 205, the control center 180 polls the recipe means 194 to determine the desired case depth range corresponding to the new part, found to be 1.00-1.50 mm. In the block 210, a part position is available in the preheating chamber 106, as indicated by the memory means 184. Next the current case depth value is set to 1.00 mm, in the block 235. In the block 245, the recipe means 194 denotes that the new part is to be processed in the slow cool chamber 124.

Next, the control center 180 calculates the arrival time to the slow cool chamber 124 in the block 250. The arrival time is a combination of the the preheating processing time predetermined to be 90 minutes, the boost processing time calculated to be 10 hours, the diffusion processing time calculated to be 2 hours, and the predetermined hardening time found to be 2 hours. The transfer time is assumed to be negligible. Therefore, the arrival time is calculated to be 15.5 hours.

Next, the control center 180 determines if a time window exists for the slow cool chamber 124 in the block 260. Assuming there are no parts scheduled to be in the slow cool chamber 124 in 15.5 hours for a predetermined amount of processing time of 2 minutes, a time window is found to exist in the array means 186. Therefore, the boost and diffusion times calculated in the block 250 are recorded in the memory means 184, in the block 275.

If a time window did not exist for the slow cool chamber 124, the computer program would then continue to the block 265 to compare the current case depth (1.00 mm) to the maximum case depth (1.50 mm) and proceed to the block 270. The current case depth would be incremented from 1.00 mm to 1.01 mm. Then in the block 250, the boost and diffusion processing times would be recalculated corresponding to the incremented case depth of 1.01 mm. Typically, the recalculated boost and diffusion processing times are longer in response to the increased case depth. This is because the greater case depth corresponds to the part being processed by the carburizing chambers 110,112 for a greater amount of time. The predetermined processing times will not change, because the predetermined processing times are specific to the type part, not the desired case depth. Next, the arrival time is calculated in response to the recalculated processing times, in the block 255. In the example shown, the arrival time is greater because the recalculated processing times are longer. Then a time window is determined for the slow cool chamber 124 in response to the greater arrival time. As shown in FIG. 3 the array means 186 reflects the availability of each processing chamber for a predetermined period of time (3000 minutes). Therefore, a time window may exist for the new part to be processed in the slow cool chamber 124 in some time period, reflected by the array means 186, which corresponds to the calculated arrival time. This looping will continue until a time window is found to exist or the maximum case depth is achieved.

Presuming a time window existed for the slow cool chamber 124, the boost and diffusion processing times were recorded in the memory means 184. The computer program proceeds to the block 280, and the recipe means 194 indicates that the new part is to be slow cooled only and no other cooling operations are to take place. Hence, the computer program proceeds to the block 345. The arrival time for the new part to the hardening chamber 122 is calculated to be 13.5 hours based on the preheating processing time of 90 minutes, the boost processing time of 10 hours, and the diffusion processing time of 2 hours. In the block 350, a time window is determined to exist for the hardening chamber 122, because only three parts, for example, are assumed to be scheduled in the hardening chamber 122, in accordance with the arrival time of the new part. Next, the computer program continues to the block 370.

The time for the new part to arrive at the diffusion chamber 112 is 11.5 hours—90 minutes for the preheating chamber 106 and 10 hours for the boost chamber 110. Assume only five parts are to be scheduled to reside in the diffusion chamber 112, as indicated by the array means 184. Therefore, in the block 375 a time window is determined to exist for the diffusion chamber 112.

Next the computer program proceeds to the block 395 where the arrival time for the boost chamber 110 is calculated. The arrival time is 90 minutes corresponding to the processing time in the preheating chamber 102. In the block 400 a time window is determined to exist for the boost chamber 110 because only three part positions are to be occupied associating with the new part's arrival time. Then the new part is moved into the preheating chamber 106 to be processed in the furnace structure 102, in the block 400.

Therefore, the control center 180 schedules the new part's entire processing time before entering the furnace structure 102, in a manner that provides for a smooth and uninterrupted flow through the furnace structure 102.

Other aspects, objects, and advantages of this invention can be obtained from a study of the drawings, the disclosure, and the appended claims.

We claim:

1. A control system for heat-treating parts in a continuous furnace structure, comprising:

a plurality of processing chambers being interconnected and having a plurality of part positions, said processing chambers including two carburizing chambers of the rotary type adapted to expose said parts to reactive carbon gases at elevated temperatures, and discharge parts independent of the sequence of said parts entering said rotary carburizing chambers, said processing chambers being adapted to simultaneously process at least two parts having unique processing times;

memory means for storing first records representing processing times associated with each of the parts within each processing chamber, second records representing a desired processing path associated with each part, said desired processing path representing the succession of respective ones of said processing chambers a part enters for processing, and third records representing the number and location of occupied part positions within each processing chamber;

recipe means for determining a desired processing path, a predetermined case depth range of carburization between a minimum and a maximum value, and a predetermined processing time associated with the respective non-carburizing chambers in response to said desired processing path, each determination corresponding to a new part being processed in said furnace structure; and scheduling means for calculating desired processing times associated with said rotary carburizing chambers for said new part in response to said predetermined case depth range, determining the availability of part positions in a respective processing chamber for processing of said new part in response to said desired path, recalculating said desired processing times in response to all of said part positions being occupied in the respective processing chamber, calculating arrival times associated with respective ones of said processing chambers in response to said desired processing path, said desired and predetermined processing times, and determining an entrance time for said new part to enter said furnace structure, in response to said arrival times for the respective processing chambers being calculated.

2. A control system, as set forth in claim 1, wherein said processing times stored in said first records represent elapsed, desired, and associated predetermined processing times.

3. A control system, as set forth in claim 1, wherein said processing chambers, include:
- a preheating chamber being adapted to heat said parts to a predetermined temperature and to deliver said preheated parts to said carburizing chambers;
- a slow cool chamber being adapted to lower the temperature of said carburized parts;
- a press and batch quench chamber each being adapted to rapidly lower the temperature of said carburized parts; and
- a rotary hardening chamber being adapted to guide said carburized parts into said press, slow cool, and batch quench and to reheat said slow cooled parts.

4. A control system, as set forth in claim 1, including an array means for storing time window records in response to said first, second, and third records, said time window records represent the number of part positions available within each processing chamber during predetermined periods of time.

5. A control system, as set forth in claim 4, including status means for periodically updating said time window records.

6. A control system, as set forth in claim 4, wherein said scheduling means includes means for determining time windows for entry of parts into each of said processing chambers in response to said time window records, a time window representing a predetermined amount of time said new part may enter a respective processing chamber for complete processing.

7. A control system, as set forth in claim 6, wherein said recipe means includes means for setting a current case depth value corresponding to said new part equal to the minimum value.

8. A control system, as set forth in claim 7, wherein said scheduling means includes means for comparing said current case depth value to said maximum case depth value and incrementing said current case depth value by a predetermined amount in response to the absence of a time window associated with the arrival time of a respective processing chamber and said current case depth value being less than said maximum value, and recalculating said desired processing times in response to said case depth value being incremented.

9. A control system, as set forth in claim 8, wherein said arrival time associated with a respective processing chamber is calculated as a combination of said desired and predetermined processing times of the respective processing chambers in which processing of said new part occurs prior to the processing of said new part within the respective processing chamber.

10. A method for heat-treating parts in a continuous furnace structure having a plurality of processing chambers being interconnected, said processing chambers having two rotary carburizing chambers each having a plurality of part positions, wherein the furnace structure is adapted to simultaneously process at least two parts having unique processing times, comprising the steps of:
- storing first records representing the processing times associated with each of the parts within said furnace structure;
- storing second records representing a desired processing path through said furnace structure associated with each part, said desired processing path representing the succession of respective ones of said processing chambers a part enters for processing;
- storing third records representing the number and location of occupied part positions within said furnace structure;
- determining a desired processing path associated with a new part to be processed in said furnace structure;
- determining a predetermined case depth range between a minimum and maximum value corresponding to said new part;
- setting a current case depth value corresponding to said new part equal to said minimum value;
- calculating desired processing times associated with said rotary carburizing chambers for processing said new part in response to said current case depth value;
- determining the availability of part positions in a respective processing chamber for processing said new part in response to said desired path;
- comparing said current case depth value associated with said new part to said maximum value and incrementing said current case depth value by a predetermined amount in response to all of said part positions being occupied in the respective processing chamber, and said current case depth value being less than said maximum value;
- recalculating said desired processing times in response to said current case depth value being incremented;
- determining an entrance time for said new part to enter said furnace structure in response to said desired processing times.

11. A method, as set forth in claim 10, including the step of determining predetermined processing times associated with the respective non-carburizing chambers in response to said desired processing path.

12. A method, as set forth in claim 11, including the step of calculating arrival time associated with respective ones of said processing chambers in response to aid desired processing path, said arrival time associated with a respective processing chamber is calculated as a combination of said desired and predetermined processing times of the respective processing chambers in which processing of said new part occurs prior to the processing of said new part within the respective processing chamber.

13. A method, as set forth in claim 12, including the step of:
- delaying the step of calculating said entrance time for said new part by a predetermined amount of time in response to said current case depth value of said new part being at said maximum value.

14. A method, as set forth in claim 12, including the step of:
- determining an entrance time for a different part in response to said current case depth value of said new part being at said maximum value.

* * * * *

UNITED STATES PATENT AND TRADEMARK OFFICE
CERTIFICATE OF CORRECTION

PATENT NO. : 5,187,670

DATED : February 16, 1993

INVENTOR(S) : Gary D. Keil and Gregory S. Holloway

It is certified that error appears in the above-identified patent and that said Letters Patent is hereby corrected as shown below:

Claim 12, column 14, line 49, delete "time" and insert --times--.

Claim 12, column 14, line 50, delete "aid" and insert --said--.

Signed and Sealed this

Fourteenth Day of December, 1993

*Attest:*

BRUCE LEHMAN

*Attesting Officer*  *Commissioner of Patents and Trademarks*